(12) United States Patent
Okuno

(10) Patent No.: US 12,260,071 B2
(45) Date of Patent: Mar. 25, 2025

(54) DISPLAY APPARATUS, STORAGE MEDIUM STORING CONTROL PROGRAM, AND METHOD OF CONTROLLING DISPLAY APPARATUS

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 337 days.

(21) Appl. No.: 17/690,146

(22) Filed: Mar. 9, 2022

(65) Prior Publication Data

US 2022/0317835 A1  Oct. 6, 2022

(30) Foreign Application Priority Data

Mar. 30, 2021  (JP) ................................ 2021-056934

(51) Int. Cl.
| | | |
|---|---|---|
| *G06F 21/60* | (2013.01) | |
| *G06F 3/0484* | (2022.01) | |
| *G06F 21/84* | (2013.01) | |

(52) U.S. Cl.
CPC .......... *G06F 3/0484* (2013.01); *G06F 21/608* (2013.01); *G06F 21/84* (2013.01)

(58) Field of Classification Search
None
See application file for complete search history.

(56) References Cited

U.S. PATENT DOCUMENTS

| | | | |
|---|---|---|---|
| 2008/0084576 A1* | 4/2008 | Dantwala ........... | H04N 1/00204 358/1.15 |
| 2012/0268770 A1* | 10/2012 | Fukuda ................ | G06F 21/608 358/1.14 |
| 2017/0264760 A1 | 9/2017 | Sato | |
| 2017/0280003 A1* | 9/2017 | Haba .................... | G06F 21/608 |
| 2019/0007562 A1 | 1/2019 | Sato | |

(Continued)

FOREIGN PATENT DOCUMENTS

| | | |
|---|---|---|
| JP | 2010122279 A | 6/2010 |
| JP | 2014134868 A | 7/2014 |
| JP | 2015060410 A | 3/2015 |

(Continued)

*Primary Examiner* — Nelson S. Giddins

(74) *Attorney, Agent, or Firm* — Scully, Scott, Murphy & Presser, P.C.

(57) ABSTRACT

A controller executes processes for a plurality of functions including a remote control function and an other function. The remote control function is a function of controlling an external terminal to display a remote control screen corresponding to an input interface and of performing a remote control of a display apparatus based on an instruction from the external terminal. The controller is configured to: in response to receiving a start request for an approval process, determine whether the remote control function is currently executed; and in response to determining that the remote control function is not currently executed, execute the approval process. The approval process is controlling a display to display an approval screen and permitting start of the other function in response to an approval operation received on the approval screen.

12 Claims, 10 Drawing Sheets

(56) References Cited

U.S. PATENT DOCUMENTS

2020/0036849 A1    1/2020  Kimura et al.

FOREIGN PATENT DOCUMENTS

| JP | 2017112499 A | 6/2017 |
| JP | 2017163292 A | 9/2017 |
| JP | 2019001291 A | 1/2019 |
| JP | 2019012971 A | 1/2019 |
| JP | 2020017124 A | 1/2020 |

* cited by examiner

DISPLAY APPARATUS, STORAGE MEDIUM STORING CONTROL PROGRAM, AND METHOD OF CONTROLLING DISPLAY APPARATUS

CROSS REFERENCE TO RELATED APPLICATIONS

This application claims priority from Japanese Patent Application No. 2021-056934 filed Mar. 30, 2021. The entire content of the priority application is incorporated herein by reference.

BACKGROUND

A display apparatus that is remotely controlled by an external terminal is known. By displaying an input interface of the display apparatus in a pseudo manner on the external terminal, it is possible to receive instructions of remote control by operating the displayed input interface.

SUMMARY

According to one aspect, this specification discloses a display apparatus. The display apparatus includes an input interface including a display, a communication interface, and a controller. The controller is configured to execute processes for a plurality of functions including a remote control function and an other function. The remote control function is a function of controlling an external terminal to display a remote control screen corresponding to the input interface and of performing a remote control of the display apparatus based on an instruction from the external terminal. The instruction from the external terminal is received through the communication interface in response to an operation on the remote control screen. The controller is configured to: in response to receiving a start request for an approval process, determine whether the remote control function is currently executed; and in response to determining that the remote control function is not currently executed, execute the approval process. The approval process is controlling the display to display an approval screen and permitting start of the other function in response to an approval operation received on the approval screen.

According to another aspect, this specification also discloses a non-transitory computer-readable storage medium storing a set of program instructions for a display apparatus. The display apparatus includes an input interface including a display, a communication interface, and a controller. The set of program instructions, when executed by the controller, causes the display apparatus to perform: executing processes for a plurality of functions including a remote control function and an other function, the remote control function being a function of controlling an external terminal to display a remote control screen corresponding to the input interface and of performing a remote control of the display apparatus based on an instruction from the external terminal, the instruction from the external terminal being received through the communication interface in response to an operation on the remote control screen; in response to receiving a start request for an approval process, determining whether the remote control function is currently executed; and in response to determining that the remote control function is not currently executed, executing the approval process. The approval process is controlling the display to display an approval screen and permitting start of the other function in response to an approval operation received on the approval screen.

According to still another aspect, this specification also discloses a method of controlling a display apparatus. The method includes: executing processes for a plurality of functions including a remote control function and an other function, the remote control function being a function of controlling an external terminal to display a remote control screen corresponding to a display of an input interface of the display apparatus and of performing a remote control of the display apparatus based on an instruction from the external terminal, the instruction from the external terminal being received through a communication interface of the display apparatus in response to an operation on the remote control screen; in response to receiving a start request for an approval process, determining whether the remote control function is currently executed; and in response to determining that the remote control function is not currently executed, executing the approval process. The approval process is controlling the display to display an approval screen and permitting start of the other function in response to an approval operation received on the approval screen.

Thus, the approval process for the other function is not executed during remote control by the external apparatus. This prevents another user who operates the external apparatus from executing the approval process on behalf of the user near the display apparatus. As a result, the deterioration of security of the display apparatus is suppressed.

The present disclosure may be realized in various forms, and may be realized in forms of the control program executed by the controller of the display apparatus and the control method of the display apparatus in addition to the display apparatus.

BRIEF DESCRIPTION OF THE DRAWINGS

Embodiments in accordance with this disclosure will be described in detail with reference to the following figures wherein.

DETAILED DESCRIPTION

There is a display apparatus that, when starting a particular function using the display apparatus, executes an approval process that permits the start of the function on condition that an approval operation to an input interface of the display apparatus is accepted. In the display apparatus with this configuration, it is assumed that the start of the function is allowed on condition that the approval operation is accepted from a user near the display apparatus. However, if the display apparatus is allowed to be remotely controlled by an external apparatus, there is a concern that an approval operation is performed through the user interface displayed on the external apparatus at a remote location. In this case, it is possible for a person other than the user near the display apparatus to perform an approval operation, and there is a concern that the security of the display apparatus may deteriorate.

In view of the foregoing, an aspect of an object of this disclosure is to, in a display apparatus configured to accept remote control from an external apparatus, suppress the deterioration of security for the display apparatus.

First Embodiment

Figure 1:
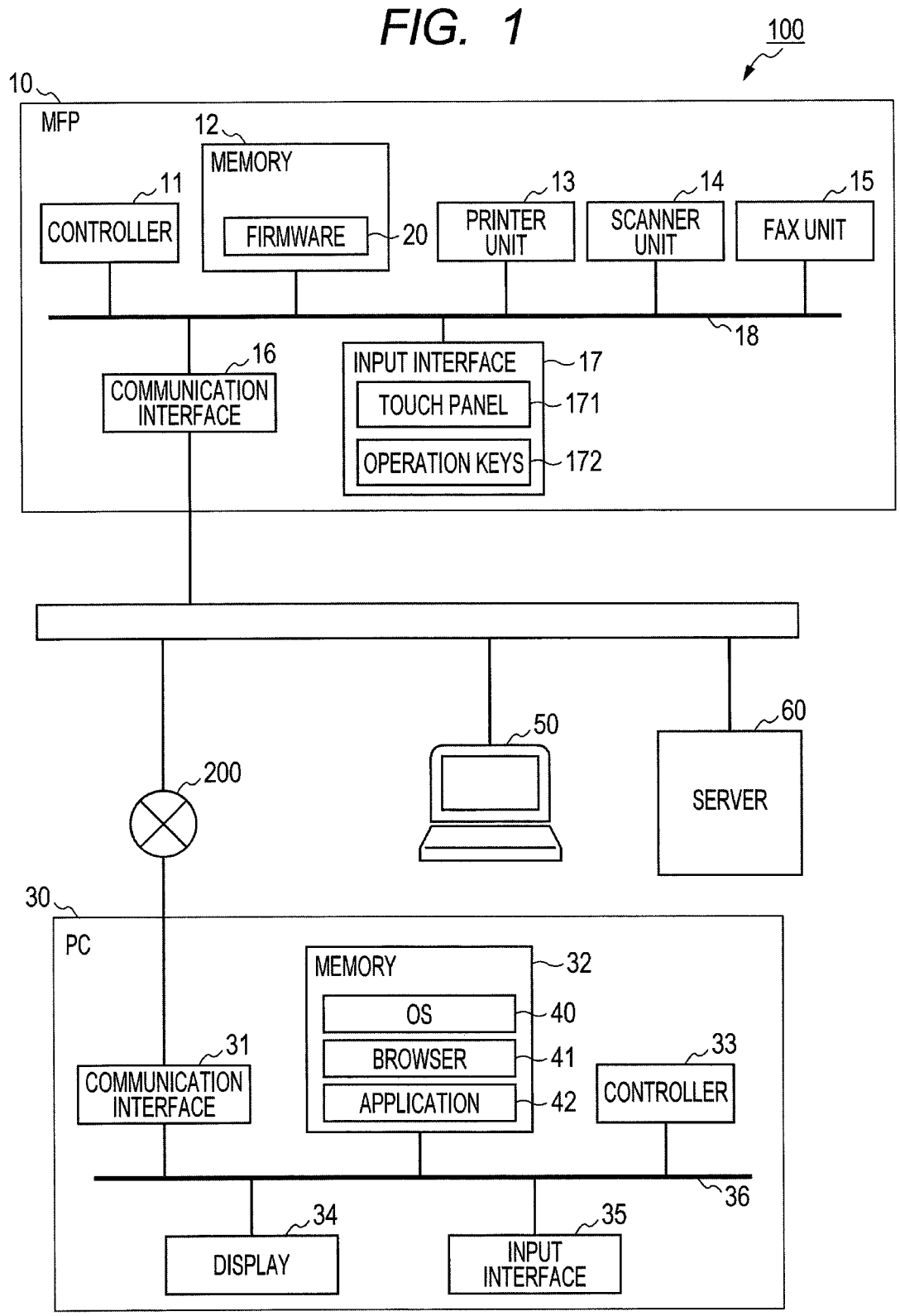
FIG. 1 is a block diagram of an image forming system.

An image forming system 100 according to an embodiment will be described with reference to the drawings. The image forming system 100 shown in FIG. 1 includes an MFP 10, PCs 30, 50, and a server 60. The MFP is an abbreviation for multifunction peripheral. The MFP 10, the PCs 30, 50, and the server 60 are connected to a network 200, and communicate with one another through the network 200. The network 200 is a LAN or the Internet. In this embodiment, the MFP 100 is an example of a display apparatus.

Next, the configuration of the MFP 10 will be described. The MFP 10 includes a controller 11, a memory 12, a printer unit 13, a scanner unit 14, a FAX unit 15, a communication interface 16, an input interface 17, and a bus 18. The IF is an abbreviation for interface.

The communication interface 16 connects the MFP 10 to the network 200 in accordance with a particular communication protocol. The communication interface 16 performs Wi-Fi ("Wi-Fi" is a registered trademark of the Wi-Fi Alliance) wireless communication based on, for example, the IEEE 802.11 standard and a standard equivalent thereto. The input interface 17 is an interface provided between a user who directly operates the MFP 10 and the controller 11, and includes a touch panel 171 that displays an image and operation keys 172 which are physical keys.

The printer unit 13 performs a print operation of printing an image on a recording medium such as a sheet or a disk. As the recording method of the printer unit 13, an inkjet method, an electrophotographic method, and so on may be adopted. The scanner unit 14 performs a scanning operation of reading an image recorded on a document and generating image data. The FAX unit 15 performs a FAX operation of transmitting and receiving image data in a method compliant with the FAX protocol. The MFP 10 may be configured to perform a combined operation in which a plurality of operations are combined. A copy operation that combines the print operation by the printer unit 13 and the scan operation by the scanner unit 14 is an example of the combined operation.

The controller 11 is composed of a CPU, an ASIC (abbreviation of Application Specific Integrated Circuit), and so on, and controls the operations of the printer unit 13, the scanner unit 14, the FAX unit 15, the communication interface 16, and the input interface 17. The memory 12 includes a data storage area. The data storage area is an area for storing data and so on necessary for executing a program and so on. The memory 12 is configured by a combination of a RAM, a ROM, an SSD, an HDD, and so on. The buffer included in the controller 11 used when executing various programs may also be regarded as a part of the memory 12. The memory 12 may be a storage medium that is readable by the controller 11. The storage medium that is readable by the controller 11 is a non-transitory medium. In addition to the above examples, the non-transitory medium also includes recording media such as a CD-ROM and a DVD-ROM. The non-transitory medium is also a tangible medium. On the other hand, an electric signal that carries a program downloaded from a server on the Internet is a signal medium that is readable by a computer, which is a kind of medium that is readable by a computer, but is not included in a non-transitory computer readable storage medium.

The memory 12 stores a firmware 20 as a control program that is executable by the controller 11. In the following description, the controller 11 that executes the program may be simply described by the program name. For example, the description "the firmware 20" is used to mean "the controller 11 that executes the firmware 20". In this embodiment, the processing of the controller 11 according to the instruction described in the program is mainly shown. That is, the processes such as "judgment", "extraction", "selection", "calculation", "determination", "identification", "acquisition", "reception", and "control" in the following description represent the processes of controller 11. Note that "acquisition" is used as a concept that does not require a request. That is, the process of the controller 11 receiving data without requesting the data is also included in the concept of "the controller 11 acquires the data". Further, the "data" in the present specification is represented by a bit string that is readable by the controller. Data having the same substantial meaning and different formats are treated as the same data. The same applies to "information" in the present specification.

The firmware 20 also functions as a Web server for displaying a particular Web page on the PCs 30 and 50. Further, the firmware 20 provides a remote panel for the PCs 30 and 50. The remote panel is a remote control function that causes the PCs 30 and 50 to display a remote screen that simulates the input interface 17 of the MFP 10 so that the MFP 10 is remotely controlled by operating the remote screen. The firmware 20 is configured to display the remote screen on a browser 41 described later of the PCs 30 and 50 by transmitting the Web page data for displaying the remote screen to the PCs 30 and 50. Information indicating various operations on the remote screen is transmitted to the MFP 10. In response to receiving the information indicating the operation, the MFP 10 executes the process according to the operation in the same manner as when the operation screen displayed on the input interface 17 is operated. For example, in response to receiving information indicating an operation to the setting button from the PC 30 or 50, the MFP 10 executes a process for setting parameters of the MFP 10, the process including displaying the setting screen. The remote screen is an example of a remote control screen.

Next, the configuration of the PC 30 will be described. The PC 30 includes a communication interface 31, a memory 32, a controller 33, a display 34, and an input interface 35. Each unit 31, 32, 33, 35 included in the PC 30 has similar configuration to the controller 11, the memory 12, the communication interface 16, and the input interface 17 included in the MFP 10, and the description thereof will be omitted.

An OS 40, the browser 41, and an application 42 are stored in the memory 32. The browser 41 is a program that causes the controller 33 to display, on the display 34, an image corresponding to the Web page data transmitted from the MFP 10 under the execution of the OS 40.

The server 60 executes various processes for providing a service using the MFP 10 to the user who operates the PC 30. In the present embodiment, the server 60 is not limited to one apparatus, but may include a plurality of apparatuses having different roles. Specifically, the server 60 includes a management server and a service server. The management server is a server for managing the MFP 10 and the PC 30 in order to provide services, and stores the information of the MFP 10 and the PC 30 to be managed. The service server is a server that provides services to the PC 30 and the MFP 10 registered in the management server.

In this embodiment, the services provided by the server 60 include "E-mail print", "remote print", and "Scan to Mobile". The "E-mail print" is a service that transfers E-mail data to which print data is attached to the MFP 10 via the server 60 (service server), and causes the MFP 10 to print the print data attached to the E-mail data. The "remote print" is a service that transfers print data to the MFP 10 via the server 60 and causes the MFP 10 to print the print data. The "Scan to Mobile" is a service that stores scan data scanned by the MFP 10 into the PC 30, 50 or the server 60 that is accessible from a mobile terminal.

Figure 2:
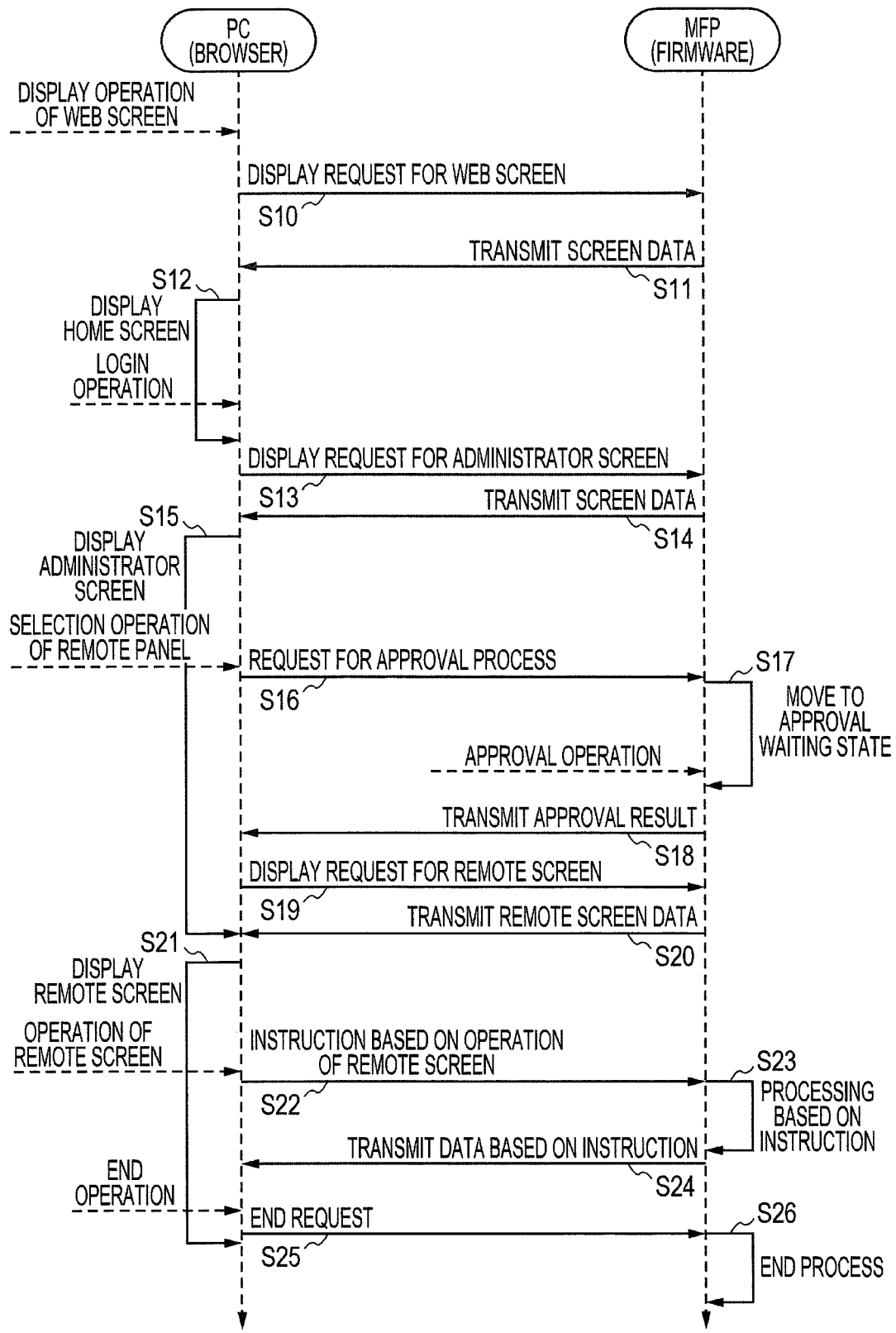
FIG. 2 is a timing chart for explaining processing relating to a remote panel.

The following will describe, with reference to FIG. 2, the procedure of processing performed between the MFP 10 and the PC 30 when the MFP 10 is remotely operated through the remote panel displayed on the PC 30.

Prior to the processing of FIG. 2, the controller 11 of the MFP 10 displays an operation screen on the touch panel 171, and changes the display of the operation screen in accordance with operations through the touch panel 171, the operation status of the MFP 10, and so on. The processing of changing the operation screen is performed in parallel with the processing of FIG. 2. Examples of the operation screen include an execution-in-process screen indicating that processing such as printing and scanning is currently executed, an instruction screen for receiving instructions for executing copying, scanning, and so on, a setting screen for changing various settings, a status screen indicating the status of the MFP 10, an execution instruction screen, a standby screen for waiting instructions for displaying the setting screen and so on.

In Step 10 (hereinafter, simply referred to as S10) of FIG. 2, the browser 41 of the PC 30 transmits a display request for web screen to the MFP 10. In response to receiving an input of an URL specifying the MFP 10 by a user, for example, the browser 41 transmits the request to the firmware 20. The communication between the browser 41 and the firmware 20 is performed in accordance with the http(s) protocol.

In response to receiving the display request for web screen, in S11 the firmware 20 transmits, to the PC 30, screen data that is web page data for displaying a web screen. In response to receiving the screen data, in S12 the browser 41 displays a home screen indicated by the received screen data on the display 34. On the home screen, there are displayed functions that may be performed by the MFP 10 and a plurality of tabs for receiving operations of specifying authority (Administrator, General). When any one of the tabs is selected, the home screen is shifted to a screen associated with the selected tab. In the embodiment, when administrator authority "Administrator" is selected on the home screen, the home screen is shifted to a screen for requesting a login password from a user operating the PC 30.

When a login operation is performed on the home screen displayed on the display 34, in S13 the browser 41 transmits, to the MFP 10, a display request for an administrator screen which is displayed only for a user with administrator authority. Here, the browser 41 transmits the input login password and so on to the MFP 10 together with the display request. In response to receiving the display request for administrator screen, the firmware 20 performs authentication of the login password. On the condition that the authentication has succeeded, in S14 the firmware 20 transmits the screen data of the administrator screen to the PC 30. In this example, the remote control function is executable with the administrator authority and is not executable with an authority (for example, guest authority) lower than the administrator authority.

In response to receiving the image data, in S15 the browser 41 displays the administrator screen on the display 34. An administrator screen 300 shown in FIG. 3 includes an item selection area 301 and a function display area 302. The item selection area 301 is an area where a list of permitted functions and so on is displayed for a user with administrator authority. The function display area 302 is an area where an image related to the function selected in the item selection area 301 is displayed.

Figure 3:
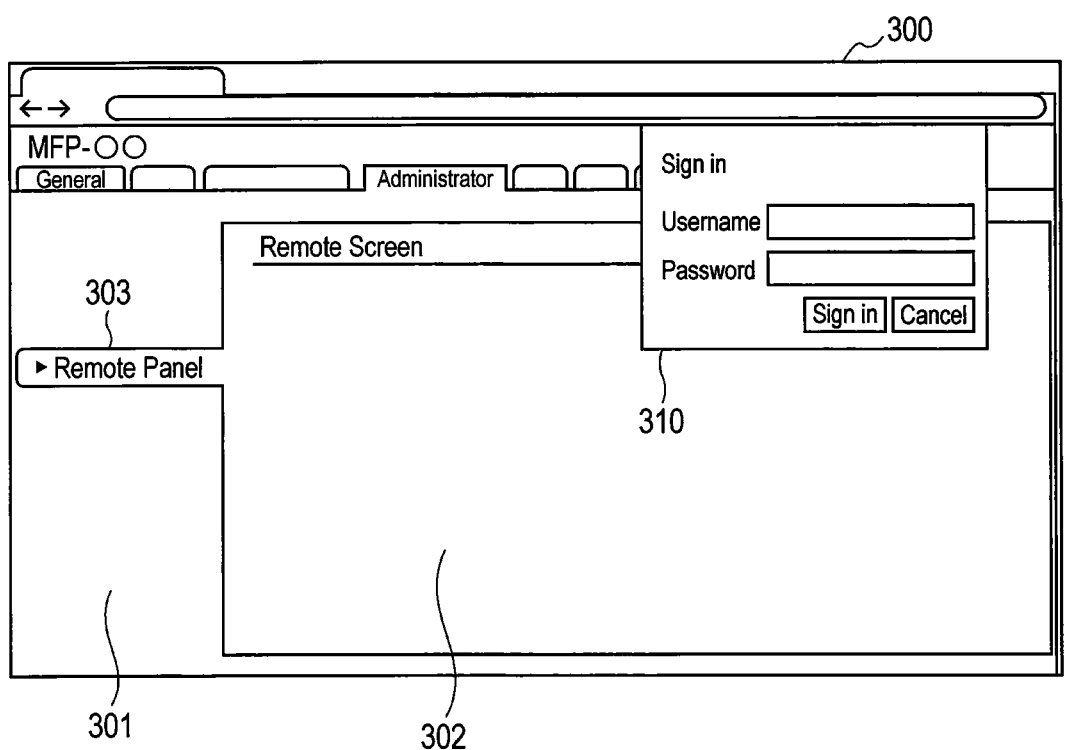
FIG. 3 is a diagram showing an administrator screen.

In response to receiving an operation of selecting an item 303 "remote panel" displayed in the item selection area 301 by the user of the PC 30, in S16 the browser 41 transmits a request for approval process to the MFP 10. In this embodiment, the browser 41 requests a login operation again when the operation of selecting the item 303 has been performed, and transmits the request for approval process on the condition that the login operation has succeeded. In FIG. 3, a login screen 310 for receiving an input of a user name and a password is superimposed on the administrator screen 300 for display. In S16, the browser 41 transmits the request for approval process to the MFP 10 on the condition that the input of the user name and the password has been received on the login screen 310.

Figure 4:
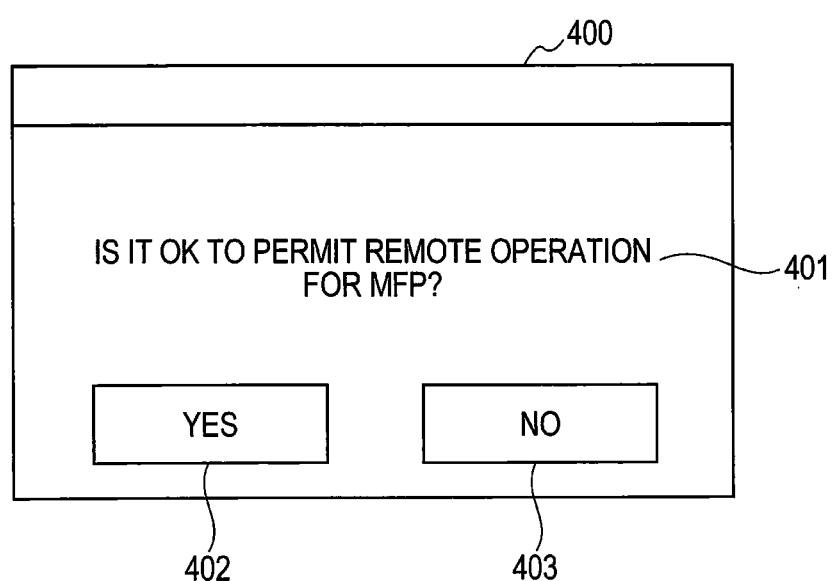
FIG. 4 is a diagram showing an approval screen.

In response to receiving the request for approval process, the firmware 20 of the MFP 10 performs an approval process in S17. Specifically, the firmware 20 displays an approval screen on the touch panel 171 to be in an approval waiting state where the reception of an approval operation by the user is possible. FIG. 4 illustrates an approval screen 400 displayed on the touch panel 171 in the approval process by the MFP 10. The approval screen 400 includes a text area 401, a YES button 402, and a NO button 403. The text area 401 displays a text asking the user whether to approve the execution of the remote panel for the MFP 10. The YES button 402 is a button for receiving an approval operation when the user approves the execution of the remote panel. The NO button 403 is a button for receiving an operation when the user does not approve the execution of the remote panel.

When an operation on the YES button 402 (that is, an approval operation) is performed by the user, in S18 the firmware 20 transmits, to the PC 30, information indicating that the remote panel has been approved as an approval result. Here, the firmware 20 issues a token for the remote panel and transmits the token to the PC 30. The token issued by the firmware 20 is a one-time token that approves the execution of the remote panel on the PC 30. Specifically, the token is information including the kinds of approved functions, information for identifying the PC 30, a state (execution-in-process of a function, end of a function), and a login ID for the case where the user executing a function has authority. The firmware 20 stores, in the memory 12, information indicating whether a token has been issued, for example, for each kind of functions. When the user has performed an operation on the NO button 403, in S18 the firmware 20 transmits information indicating that the remote panel has not been approved as an approval result.

Figure 5:
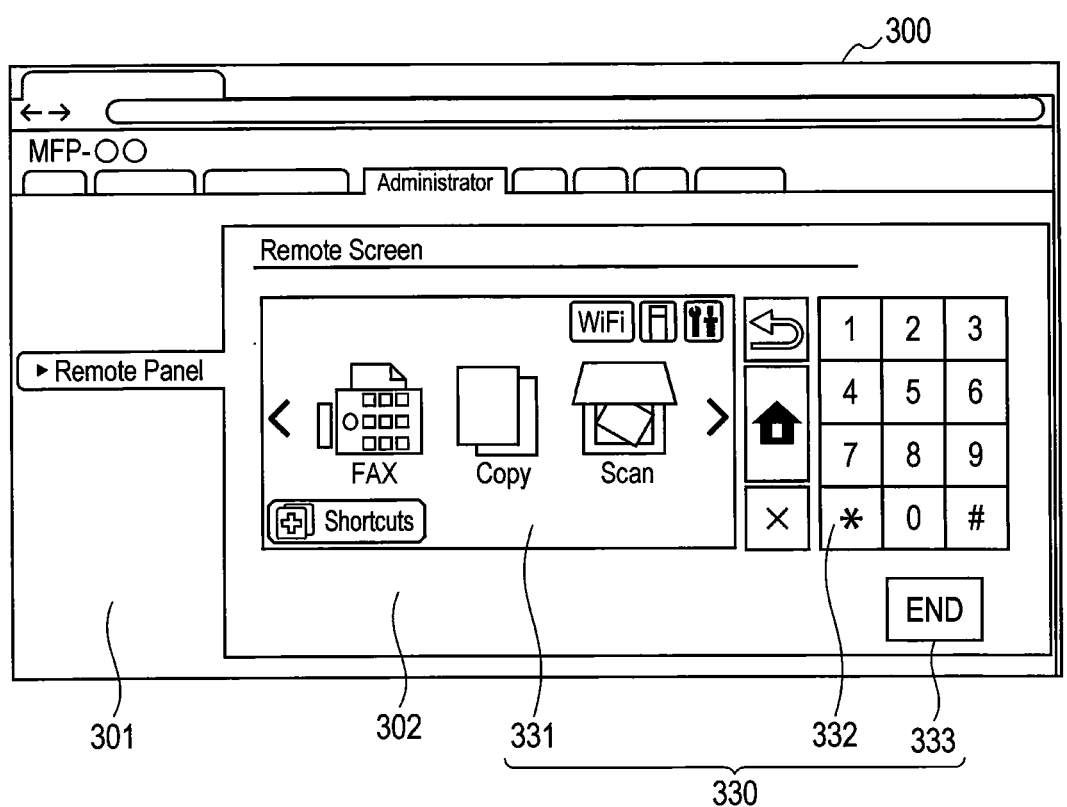
FIG. 5 is a diagram showing a remote screen.

In response to receiving the approval result indicating that the remote panel has been approved from the MFP 10, in S19 the browser 41 transmits a display request for remote screen to the MFP 10. In response to receiving the display request for remote screen, in S20 the firmware 20 transmits remote screen data that is web page data for updating a web screen. In the embodiment, the remote screen data is data including data indicating an operation screen currently displayed on the touch panel 171 of the MFP 10. In response to receiving the remote screen data, in S21 the browser 41 interprets the remote screen data and displays a remote screen on the display 34. FIG. 5 illustrates an example of a screen displayed on the display 34 in S21. On the administrator screen 300 displayed in S21, a remote screen 330 is displayed in the function display area 302. The remote screen 330 includes a screen display area 331, an operation key display area 332, and an end button 333. In the screen display area 331, the same screen as the operation screen currently displayed on the touch panel 171 of the MFP 10 is displayed. FIG. 5 illustrates an example in which a standby screen is displayed in the screen display area 331. In the operation key display area 332, an image imitating the operation keys 172 of the input interface 17 is displayed.

The data indicating the operation screen, the operation key, and the end button that are included in the remote screen data, may have the same data format such as raster data, or other data formats. The data indicating the operation screen, the operation key, and the end button may have mutually different data formats. In S20, the firmware 20 may transmit only data indicating the operation screen as remote screen data to the browser 41, and in S21 the browser 41 may display a remote screen by superimposing data indicating the operation key and the end button on the remote screen data. Furthermore, instead of transmitting the remote screen data to the browser 41, in S20 the firmware 20 may transmit, to the browser 41, web page data for displaying the entire screen including the remote screen data.

In response to receiving an operation on the remote screen 330 (FIG. 5) displayed on the display 34, in S22 the browser 41 transmits, to the firmware 20, a request for an instruction based on the received operation. Here, the browser 41 transmits the token already issued by the firmware 20 together with the request for an instruction in accordance with the operation. For example, when the operation on the remote screen 330 is an operation related to an update of the screen, the browser 41 transmits a request for updated remote screen display to the firmware 20 together with the token. In response to receiving the instruction from the PC 30, in S23 the firmware 20 updates the screen currently displayed on the touch panel 171 based on the instruction received through the remote screen on the condition that the token is correct. In S24, the firmware 20 creates remote screen data for displaying the updated remote screen 330 and transmits the created remote screen data to the browser 41.

The remote screen 330 displayed on the display 34 of the PC 30 is updated also when the user of the MFP 10 operates the input interface 17. In this case, in response to receiving an operation for changing the screen displayed on the touch panel 171, the firmware 20 transmits remote screen data related to the updated remote screen 330 to the PC 30. In response to receiving the operation input on the end button 333 by the user, in S25 the browser 41 transmits, to the firmware 20, an end request for remote panel as well as the token. In response to receiving the end request from the PC 30, in S26 the firmware 20 performs an end process for ending the remote panel on the condition that the token is correct. When the firmware 20 ends the remote panel, various kinds of information such as information indicating the execution state of the remote panel stored in the memory 12, information indicating that the token is already issued, and information indicating the permission state of the remote panel are deleted. Also, when there has been no access from the browser 41 for a certain period of time since the start of the remote panel, the firmware 20 may end the remote panel, similarly to when the end button is pressed.

The following will describe the processing performed among the MFP 10, the PC 30, and the server 60 when the PC 30 is operated to execute online function settings that are a function other than the remote panel. The online function settings are a function for performing initial settings for the above-described "Email print", "remote print", "Scan to Mobile", and so on, online by operating the PC 30. By performing the online function settings, the PC 30 and the MFP 10 are registered in the server 60 as the apparatuses used in various kinds of services.

In response to the user's operation on the PC 30 to perform a display operation for displaying the web screen, in S30 the browser 41 transmits a display request for web screen to the MFP 10. In response to receiving the display request for web screen, in S31 the firmware 20 of the MFP 10 transmits screen data for displaying the web screen.

In response to receiving the screen data, in S32 the browser 41 displays a home screen by using the received screen data. The home screen displayed in S32 is the same screen as the home screen displayed in S12 of FIG. 2. It is assumed that the user has selected the tab "General (guest)" on the home screen and has selected the item "Online function settings" in the item selection area 301. In S33, the browser 41 transmits a request for displaying a screen related to "Online function settings" to the MFP 10. The online function settings may be selected also from the administrator screen displayed by selecting the tab "Administrator" on the home screen. In this case, the user operating the PC 30 is required to perform a login operation on the home screen, in the same manner as S12 of FIG. 2.

Figure 7:
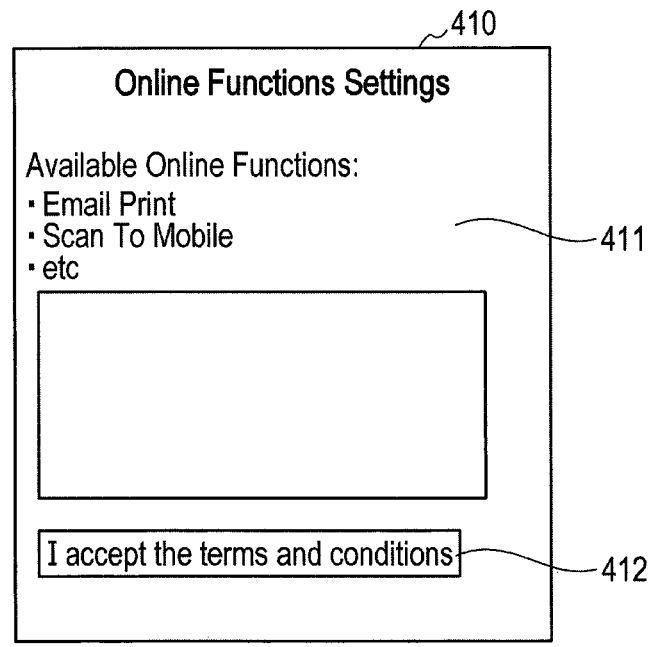
FIG. 7 is a diagram showing a screen relating to online function settings.

In response to receiving the screen display request, in S34 the firmware 20 of the MFP 10 transmits image data for the online function settings to the PC 30. In S35, the browser 41 displays a screen 410 related to the online function settings shown in FIG. 7 using the received screen data. The screen 410 shown in FIG. 7 includes a text display area 411 and an execution button 412. The text display area 411 displays a text indicating that the execution of online initial settings for various kinds of services including "Email print" is possible. The execution button 412 is a button for receiving an operation for starting the online function settings.

In response to receiving the operation on the execution button 412 by the user through the input interface 35, the browser 41 transmits an activation request for online function settings in S36. In response to receiving the activation request, the firmware 20 performs a determination process for determining whether to permit an approval process for the online function settings.

Figure 8:
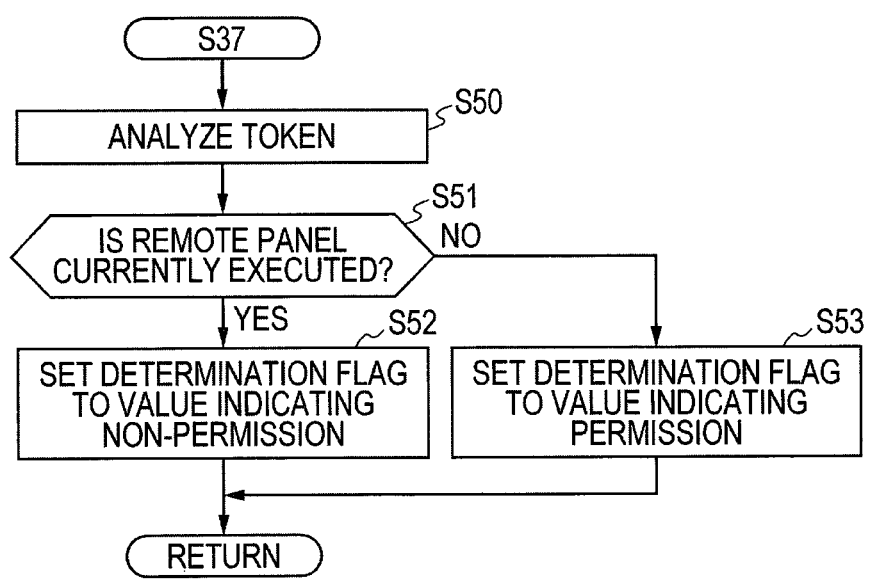
FIG. 8 is a flowchart of processing executed in S37 of FIG. 6.

FIG. 8 shows the details of the determination process performed in S37. In S50, a currently issued token is analyzed. As described above, the token is information issued when the execution of various functions or services is permitted. Particularly, when the remote panel for the MFP 10 is permitted, the memory 12 stores information that a token has been issued to a PC with which the remote control is performed. Specifically, in a case where a remote panel is being executed between the PC 50 and the MFP 10 prior to the online function settings with the PC 30, the MFP 10 has already issued a token to the PC 50.

If a token for the remote panel is issued currently, a positive determination is made in S51, and the processing advances to S52. In S52, the determination flag is set to a value not permitting approval process for the online function settings. The approval process is processing for permitting the execution of functions on the condition that an approval operation by the user near the MFP 10 is received on the approval screen displayed on the touch panel 171. However, when a remote panel for the MFP 10 is permitted, persons other than the person near the MFP 10 are able to perform an approval operation, which may deteriorate the security of the MFP 10.

If no token for the remote panel is issued currently, a negative determination is made in S51, and the processing advances to S53. In S53, the determination flag is set to a value permitting the approval process for the online function settings. This is because, when the remote panel is not currently executed, the security of the MFP 10 is unlikely to be deteriorated even if the approval process is performed. After the processing of S52 or S53, the processing advances to S38 of FIG. 6.

In S38, the firmware 20 determines whether the approval process has been permitted by the determination process in S37. Specifically, when the determination flag is set to a value indicating permission in S38, the processing advances to S40. In S40, the firmware 20 shifts the state to an approval waiting state to start the approval process. That is, in the approval process, the firmware 20 displays an approval screen on the touch panel 171 and receives an approval operation by the user through the input interface 17. The approval screen displayed in S40 is a screen for receiving an approval operation for approving the execution of online function settings or an operation for not approving such execution, similarly to the approval screen in the remote panel shown in FIG. 4. When an approval operation has been received on the approval screen, the firmware 20 advances the procedure to S41. When no approval operation is received on the approval screen, the firmware 20 ends the processing of FIG. 6 and does not perform online function settings.

In S41, the firmware 20 and the management server perform an apparatus (MFP) setup process for registering the MFP 10 as a device used in various services. In S42, the firmware 20 and the management server perform processing for acquiring a token for online function settings. As described above, the token is information issued when the online function settings are permitted.

In S43, the firmware 20 transmits, to the PC 30, an URL indicating the address of a setting screen for online function settings. The setting screen whose address is specified by the URL transmitted in S43 is a screen for setting various services online, and is a web page provided by the service server. In S44, the browser 41 of the PC 30 performs redirect to the URL transmitted from the MFP 10, thereby displaying the setting screen for online function settings on the display 34.

Figure 6:
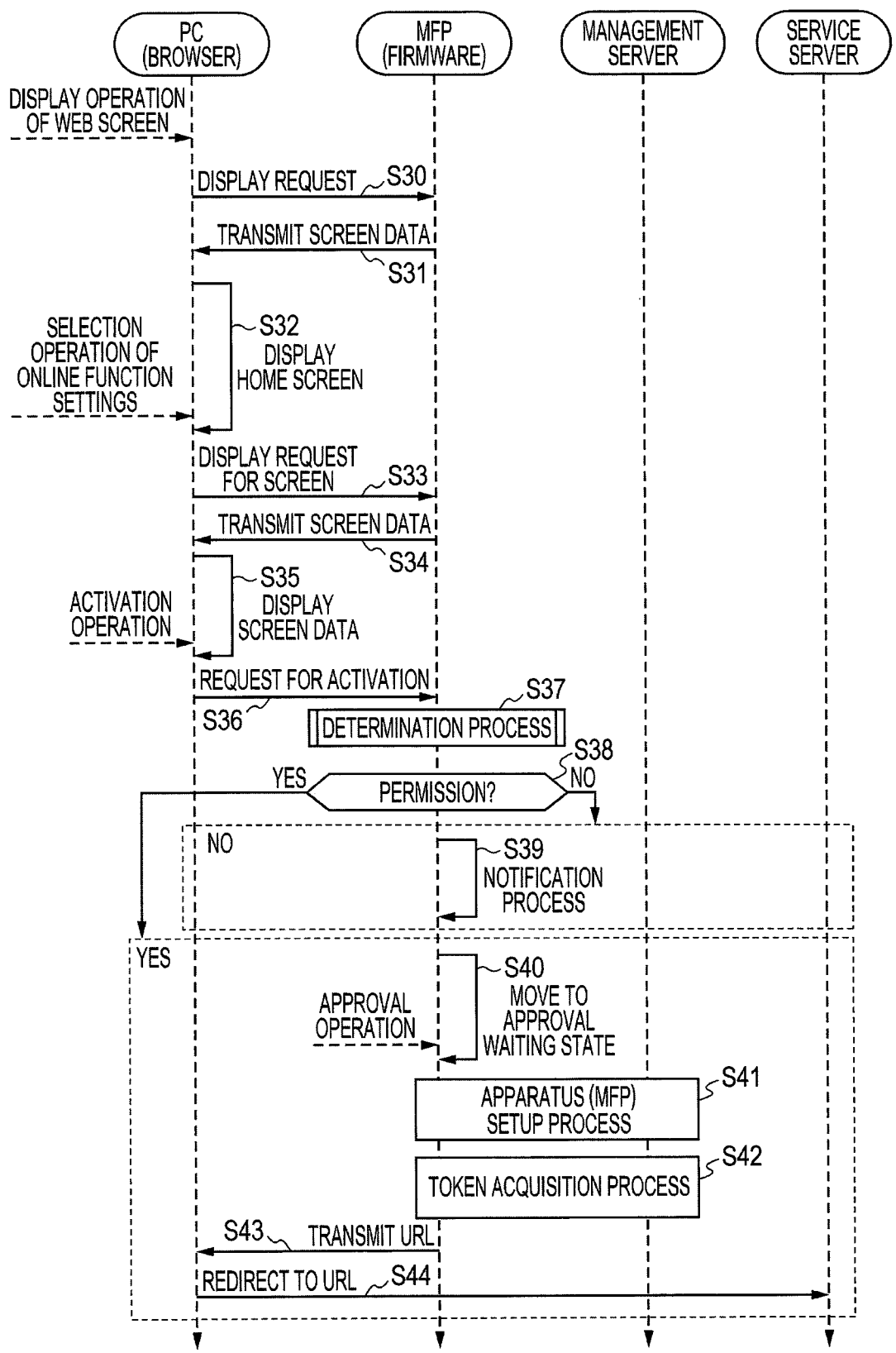
FIG. 6 is a timing chart for explaining online function settings.

If the determination flag is set to a value indicating non-permission in S38, the processing advances to S39. In S39, the firmware 20 performs a notification process for notifying the user of non-permission for the online function settings. Specifically, the firmware 20 displays, on the touch panel 171, a screen that the remote panel is currently executed and the online function settings have not been permitted. Here, the remote panel for the MFP 10 is currently executed. Thus, the firmware 20 may display a screen indicating that the online function settings have not been permitted, on the display of the PC 50 that is performing remote control using the remote panel. That is, when it is determined that a remote panel is currently executed, the firmware 20 does not display an approval screen on the touch panel 171. After the processing in S39, the processing of FIG. 6 is ended. In the embodiment, the processing of S38, S39, and S40 performed by the firmware 20 are examples of an execution control process.

In the embodiment described above, the following effects are obtained. The controller 11 of the MFP 10 permits the start of the online function settings by the approval operation received on the approval screen displayed on the touch panel 171. In response to receiving the start request for the approval process and determining that the remote panel is currently executed, the controller 11 does not execute the approval process. In response to receiving the start request for the approval process and determining that the remote panel is not currently executed, the controller 11 executes the approval process. This prevents a user who is not near the MFP 10 from executing the approval process by a remote control and hence suppresses the deterioration of the security of the MFP 10.

In response to determining that the remote panel is currently executed, the controller 11 controls the touch panel 171 to display that the remote panel is currently executed. Thus, the user who operates the MFP 10 determines that the online function settings cannot be executed because the remote panel is currently executed.

Second Embodiment

In a second embodiment, a configuration different from that of the first embodiment will be mainly described. In the second embodiment, the same parts as those in the first embodiment are designated by the same reference numerals, and the description thereof will not be repeated.

In the first embodiment, the browser 41 of the PC 30 executes online function settings by using the web page data transmitted from the firmware 20. Alternatively, in this embodiment, the PC 30 is configured to execute online function settings on the application 42 in addition to the execution of online function settings on the browser 41.

Figure 9:
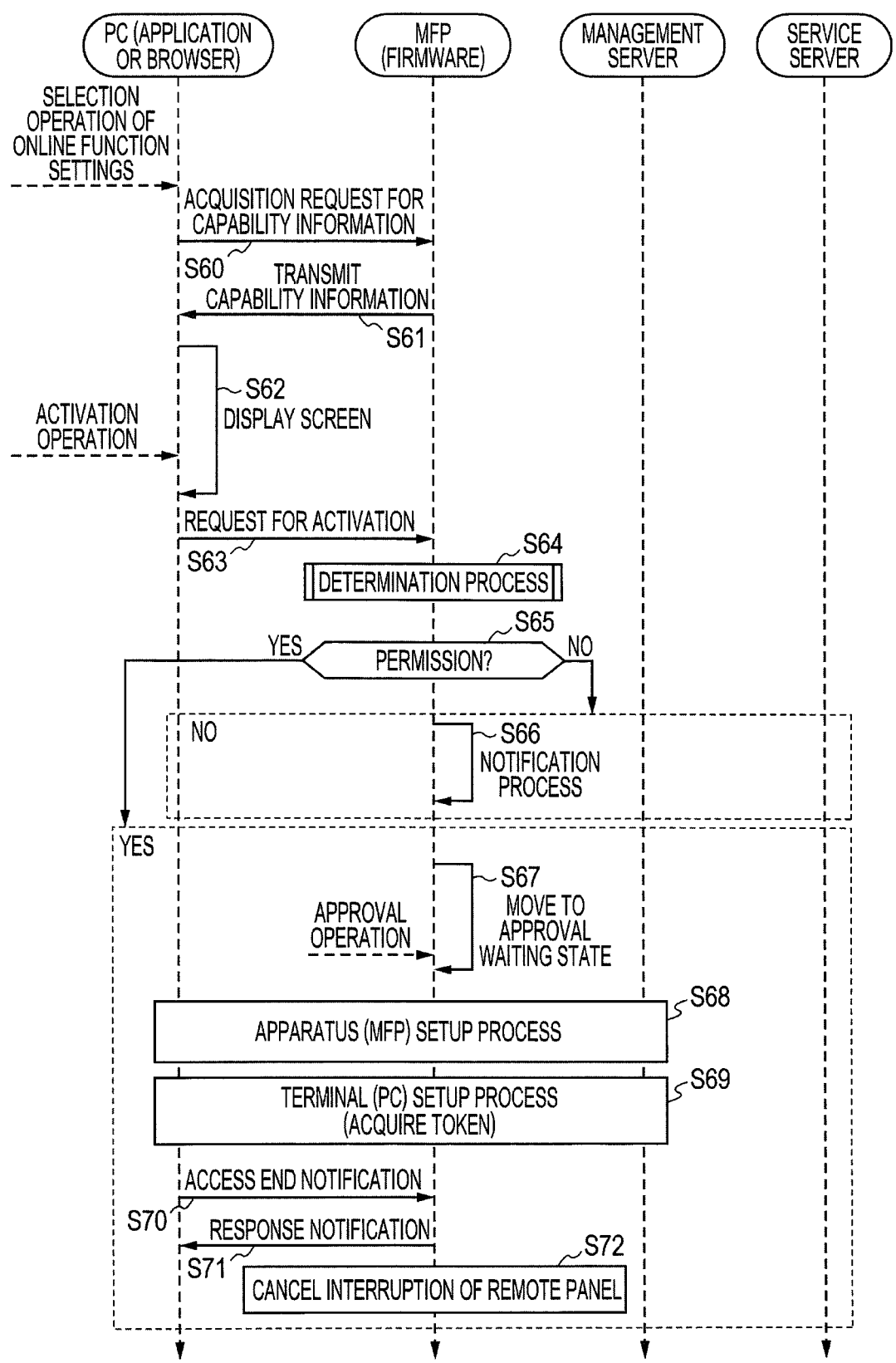
FIG. 9 is a timing chart for explaining online function settings.

FIG. 9 illustrates the processing of the devices when online function settings are executed in this embodiment. First, a case will be described in which the user has performed an operation of selecting online function settings on the application 42. In S60, the application 42 transmits an acquisition request for capability information to the MFP 10. The capability information is information indicating the kinds of functions and the kinds of services that may be performed by the MFP 10. Specifically, when the MFP 10 supports the online function settings, the items indicated in the capability information include the online function settings.

In response to receiving the acquisition request for capability information, in S61 the firmware 20 of the MFP 10 reads out the capability information of the MFP 10 itself from the memory 12 and transmits the capability information to the PC 30.

Figure 10:
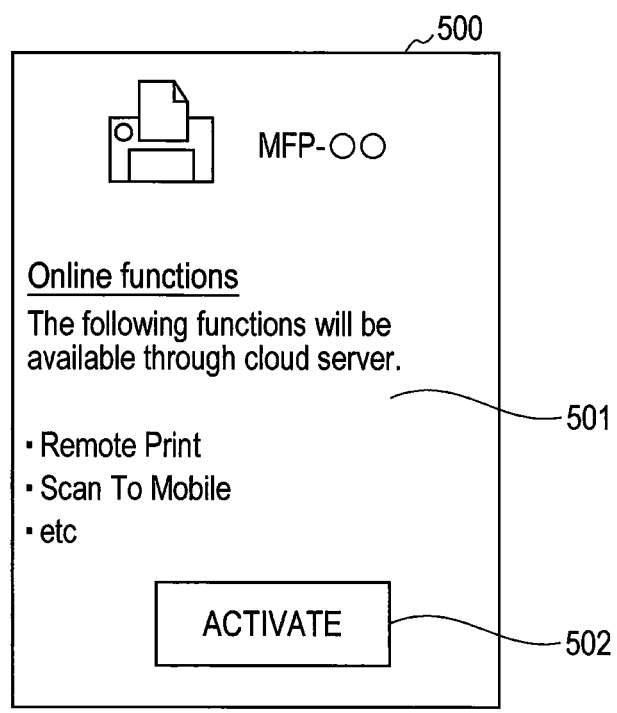
FIG. 10 is a diagram showing a screen displayed by an application.

The application 42 of the PC 30 determines that the MFP 10 supports online function settings based on the capability information transmitted in S61. Thus, a setting screen corresponding to the online function settings is displayed in S62. Specifically, the application 42 displays a setting screen 500 shown in FIG. 10. The setting screen 500 includes a text display area 501 and an activation button 502. The text display area 501 displays a text indicating that the execution of online function settings for various kinds of services is possible through the network 200. The activation button 502 is a button for receiving an operation for starting the online function settings.

In response to detecting the reception of the operation on the activation button 502 on the setting screen 500, the application 42 transmits an activation request for online function settings to the MFP 10.

Figure 11:
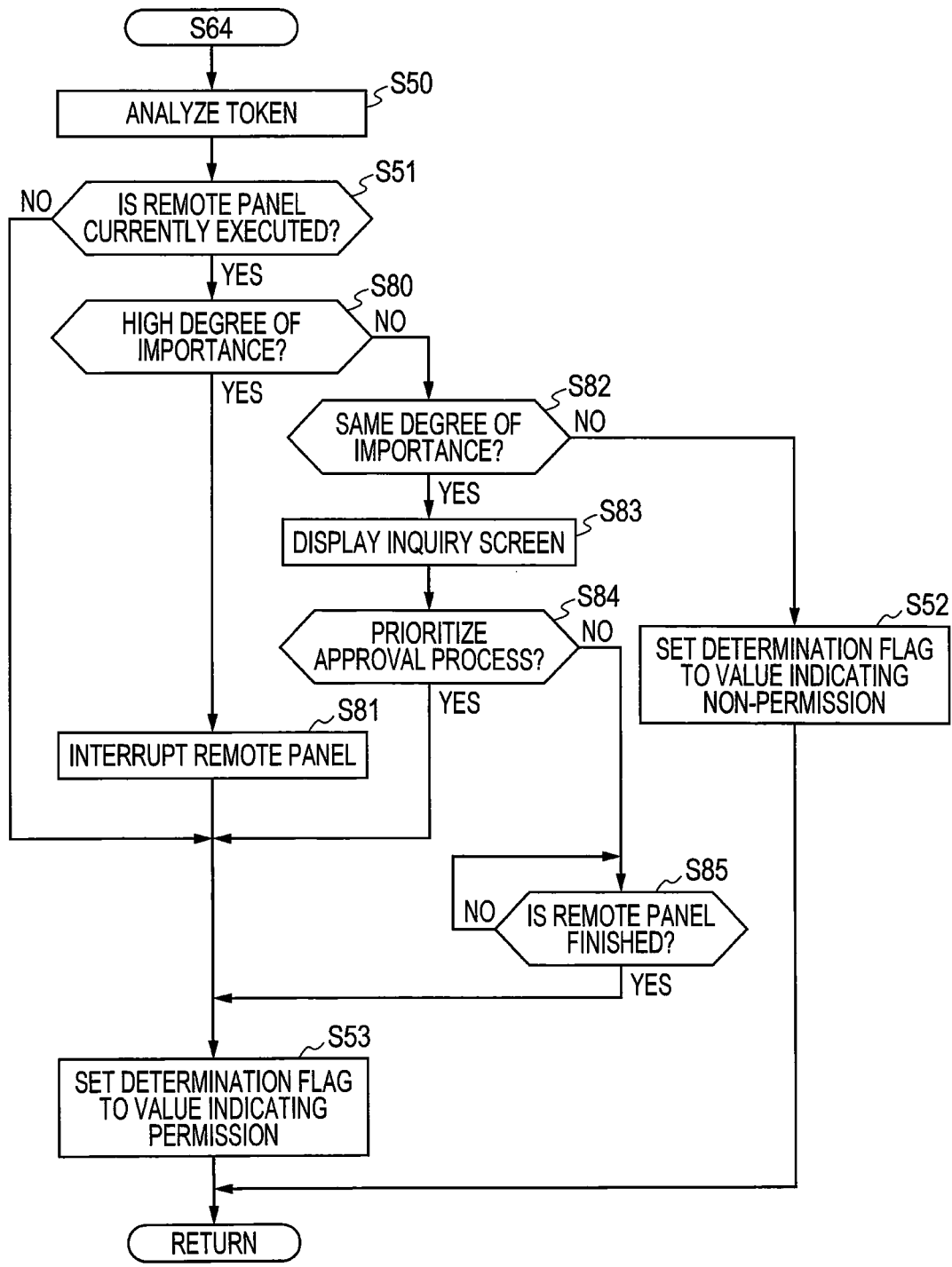
FIG. 11 is a flowchart of processing executed in S64 of FIG. 9.

In response to receiving the activation request, in S64 the firmware 20 of the MFP 10 performs a determination process for determining whether to permit the execution of online function settings. FIG. 11 shows the details of the determination process performed in S64, and the firmware 20 performs this process. In S50, the firmware 20 analyzes a token that is currently issued. When it is determined in S50 that a token for a remote panel is currently issued, a positive determination is made in S51, and the processing advances to S80.

In S80, the firmware 20 determines whether the degree of importance of online function settings which are the target of the approval process is higher than the degree of importance of the remote panel. In this embodiment, when the degree of importance is compared, the degree of importance of a function executed with an administrator authority is higher than the degree of importance of a function executed with a guest authority. Specifically, the degree of importance of online function settings on the browser 41 executed with administrator authority is equal to the degree of importance of the remote panel. The degree of importance of online function settings on the browser 41 executed with guest authority is lower than the degree of importance of the remote panel. Further, the online function settings on the application 42 are executed with guest authority, and thus the degree of importance thereof is lower than the degree of importance of the remote panel. In this embodiment, the online function settings on the browser 41 executed with administrator authority are examples of a first function. The guest authority is an example of the authority lower than administrator authority. The online function settings on the browser 41 executed with guest authority and the online function settings executed on the application 42 are examples of a second function.

When the degree of importance of the function which is the target of the approval process is equal to or lower than the degree of importance of the remote panel, a negative determination is made in S80, and the processing advances to S82. It is determined in S82 whether the degree of importance of the function which is the target of the approval process is equal to the degree of importance of the remote panel. Here, the target of the approval process is the online function settings on the application 42. Thus, a negative determination is made in S82, and the processing advances to S52. In S52, the determination flag is set to a value indicating non-permission for the approval process for the online function settings.

When the remote panel is not executed currently, and a negative determination is made in S51, the processing advances to S53 where the determination flag is set to a value indicating permission for the approval process for the online function settings. After the processing of S52 or S53, the processing advances to S65 of FIG. 9.

In S65, the firmware 20 of the MFP 10 determines whether it is determined in S64 that the execution of the approval process for the online function settings has been permitted. Specifically, if the determination flag is set to a value indicating permission for the approval process in S64, the processing advances to S67.

Figure 12:
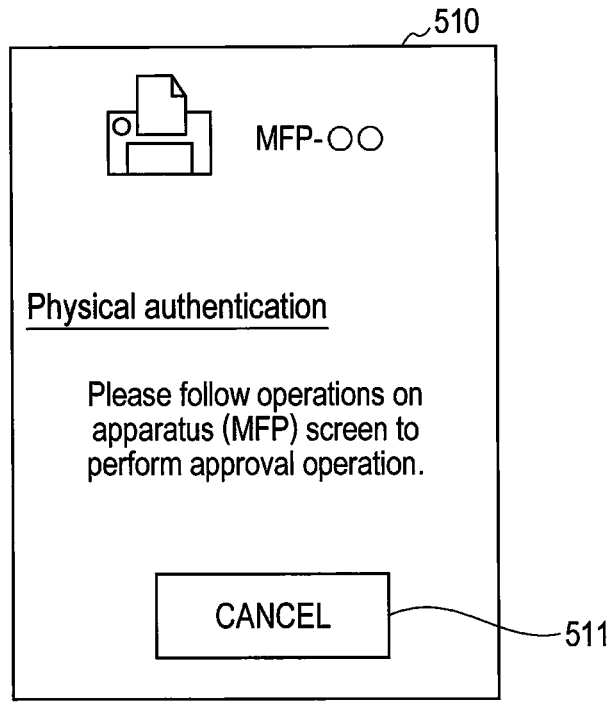
FIG. 12 is a diagram showing a screen displayed by the application.

In S67, the firmware 20 shifts the state to an approval waiting state to start the approval process. After the shift to the approval waiting state, the firmware 20 displays the approval screen on the touch panel 171. Here, when a negative determination is made in S51 of FIG. 11 and the processing advances to S53, the remote panel for the MFP 10 is not executed. Thus, the firmware 20 performs the approval process in response to receiving an operation on the approval screen displayed on the touch panel 171 of the MFP 10. In this case, as shown in FIG. 12, the firmware 20 displays, on the PC 30, a screen 510 indicating that the approval process is currently performed. Note that, when the user operates a cancel button 511 on the screen 510 shown in FIG. 12, an end request for approval process is transmitted from the PC 30 to the MFP 10. When the approval operation has been received on the approval screen, the processing advances to S68. When the approval operation is not received on the approval screen, the firmware 20 ends the online function settings.

In S68, the firmware 20 and the management server perform an MFP setup process for registering the MFP 10 as a device used in various services. In S69, a terminal (PC) setup process is performed to set the PC 30 as a terminal used in various kinds of services. Here, a token acquisition process is performed between the application 42 and the management server.

In S70, the application 42 transmits, to the firmware 20, an access end notification indicating that the processing in S68 and S69 have ended. In response to receiving the access end notification, the firmware 20 transmits a response notification to the PC 30 in S71. In S72, the firmware 20 determines whether the remote panel is temporarily interrupted by the processing of S81 (FIG. 11) described later. Here, it is assumed that the remote panel is not interrupted by the processing in S81, and the firmware 20 does not perform the processing of S72.

Figure 13:
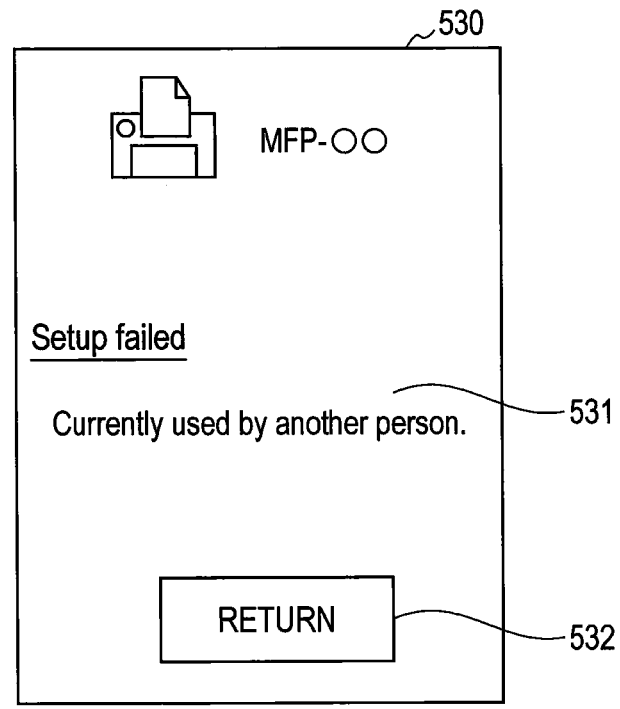
FIG. 13 is a diagram showing a notification screen displayed by the application.

When a negative determination is made in S65, the processing advances to S66 where the firmware 20 performs a notification process for notifying the user of non-permission for the approval process for the online function settings. In the notification process performed in S66, the firmware 20 transmits screen data for displaying a notification screen 530 shown in FIG. 13 to the PC 30. The notification screen 530 includes a text indicating that another user is using the MFP 10 through the remote panel and a return button 532 for receiving an operation for ending the online function settings. When the user operates the return button 532 through the input interface 35 of the PC 30, the processing of FIG. 9 is ended. In S66, the firmware may display, on the touch panel 171, a screen indicating that the remote panel is currently executed and the approval process for online function settings has not been permitted, similarly to the notification process performed in S39. In the embodiment, the processing of S65, S66, and S67 performed by the firmware 20 are examples of an execution control process.

The following will describe, as an example, the case where the user has selected online function settings on the browser 41, similarly to the first embodiment. When the online function settings are performed on the browser, the processing of S60, S61, and S62 of FIG. 9 may be replaced with the processing of S30, S31, and S32 of FIG. 6. After whether a token for the remote panel exists is determined in S50 of FIG. 11 specifically illustrating the processing of S64, the processing advances to S51. When a positive determination is made in S51, the processing advances to S80 to determine whether the degree of importance of the target function of the approval process is higher than the degree of importance of the remote panel. When the target function of the approval process is online function settings on the browser 41 performed with guest authority, a negative determination is made in S80, and the processing advances to S82. Furthermore, a negative determination is made in S82, and the processing advances to S52 where the determination flag is set to a value indicating non-permission.

When the target function of the approval process is online function settings on the browser 41 executed with administrator authority, the degree of importance thereof is equal to the degree of importance of the remote panel. Thus, a negative determination is made in S80, and a positive determination is made in S82. Then, the processing advances to S83. In S83, an inquiry screen is displayed on the touch panel 171. The inquiry screen is a screen for asking the user near the MFP 10 whether to display an approval screen for online function settings even while the remote panel is currently executed. When the user performs an operation for prioritizing the approval process on the inquiry screen, a positive determination is made in S84, and the processing advances to S53. In S53, the determination flag is set to a value permitting the approval process for the online function settings. This is because the user himself/herself has selected the execution of the approval process in a state where the remote panel is being executed.

When the user has performed an operation for not prioritizing the approval process on the inquiry screen, a negative determination is made in S84, and the processing advances to S85. The firmware 20 determines in S85 whether the remote panel has been ended. When a negative determination is made in S85, the firmware 20 stands by. That is, a value of the determination flag is not set until the remote panel that is currently executed is ended. For example, when the PC 50 has ended the execution of the remote panel and an end instruction for remote panel has been received from the PC 50, a positive determination is made in S85, and the processing advances to S53. In S53, the determination flag is set to a value permitting the approval process for the online function settings.

Alternatively, when the positive determination is made in S82, the firmware 20 may not display the inquiry screen on the touch panel 171. In this case, when the positive determination is made in S82, the processing immediately advances to S53. Thus, the processing in S83 and S84 may be omitted. Alternatively, when the positive determination is made in S82, the processing may advance to S81 to interrupt the remote panel and then set the determination flag to a value permitting the approval process in S53.

When the degree of importance of the target function of the approval process is higher than the degree of importance of the remote panel in S80, a positive determination is made in S80, and the processing advances to S81. In S81, the execution of the remote panel is temporarily interrupted. This is to prevent a remote operation by other users in the approval process because the degree of importance of the target function of the approval process is high. After the processing in S81, the processing advances to S53 where the determination flag is set to a value permitting the approval process for the online function settings. After the processing of S52 or S53, the processing advances to S65 of FIG. 9. Thereafter, when the firmware 20 performs positive determination in S65, the processing advances to S67 where the approval process is performed. Here, when a positive determination is made in S84 of FIG. 11 and the approval process is performed, the remote panel for the MFP 10 is executed. Thus, in the approval process, the user is able to perform an approval operation on the approval screen displayed on the touch panel 171 of the MFP 10 or on the approval screen (remote screen) displayed on the display 34 of the PC 50. In other words, in accordance with the approval operation on the approval screen (remote screen) displayed on the display 34 of the PC 50, the MFP 10 is able to permit the start of online function settings with the instruction received through the communication interface 16.

After the processing in S68 to S71, the firmware 20 determines in S72 whether the execution of the remote panel is temporarily interrupted by the processing in S81 (FIG. 11). If the remote panel is interrupted by the processing in S81, the firmware 20 cancels interruption of the remote panel (that is, restarts the remote panel).

In the embodiment described above, the following effects are obtained. In response to determining that the remote panel is currently executed and that the degree of importance of the other function for which the start request of the approval process is received is higher than the degree of importance of the remote panel, the controller 11 executes the approval process for which the start request is received in a state where the remote panel is suspended, and restart the remote panel after this approval process is completed. In response to determining that the remote panel is currently executed and that the degree of importance of the other function for which the start request of the approval process is received is lower than the degree of importance of the remote panel, the controller 11 does not execute the approval process for which the start request is received. Thus, the approval process is executed for a function with a high degree of importance, even when the remote panel is currently executed. This suppresses adverse effects of uniformly disabling the approval process for which the start request is received.

In response to determining that the remote panel is currently executed and that the degree of importance of the other function for which the start request of the approval process is received is equal to the degree of importance of the remote panel, the controller 11 controls the touch panel 171 to display an inquiry screen for inquiring whether to execute the approval process with priority. In response to receiving an instruction operation to prioritize the approval process on the inquiry screen, the controller 11 controls the touch panel 171 to display the approval screen and permit the start of the other function depending on the approval operation for the approval screen. In response to receiving an instruction operation to not prioritize the approval process on the inquiry screen, the controller 11 puts the approval process for which the start request is received on hold. Thus, even when the remote panel is currently executed, the approval process is executed if the user approves the approval process. Thus, the other function is permitted or disapproved flexibly, compared with a case where the approval process is never executed.

In response to receiving the end instruction for the remote panel from the external terminal after suspending the approved process for which the start request is received, the controller 11 executes the suspended approval process. Thus, the approval process for the other function is executed while avoiding a state where the security may be deteriorated.

Modification of the Second Embodiment

In the second embodiment described above, the presence or absence of the authority (administrator authority and guest authority) of the user who executes the function is determined as a comparison of degree of importance. Alternatively, the degree of importance may be set preliminarily for each function. In this case, when the degree of importance of the online function settings is set higher than the degree of importance of the remote panel, the firmware 20 makes a positive determination in S80 in FIG. 11 and proceeds to S81. In contrast, when the degree of importance of the online function settings is set lower than the degree of importance of the remote panel, the firmware 20 makes a negative determination in S80 and S82 in FIG. 11 and proceeds to S52.

Other Embodiments and Modifications

While the disclosure has been described in detail with reference to the above aspects thereof, it would be apparent to those skilled in the art that various changes and modifications may be made therein without departing from the scope of the claims.

In the above-described embodiment, the online function settings have been described as an example as the other function. Alternatively, the other function may be any function or service that requires an approval process. For example, the other function may be services such as "E-mail print", "remote print", and "Scan to Mobile". In this case, when an approval process is required prior to the execution of each service and the PC 30 requests the MFP 10 to start the service (for example, the request for activation of S36 in FIG. 6), the determination process in S37 is executed.

In the above-described embodiments, the MFP 10 has been described as an example of the display apparatus. However, the display apparatus may be any display apparatus configured to display an approval screen, such as a touch panel or a display, and may be a printer, a scanner, a copier, and so on. The PC has been described as an example of the terminal, but the terminal may be a mobile terminal such as a smartphone.

What is claimed is:

1. A display apparatus comprising:
an input interface including a display;
a communication interface; and
a controller configured to execute processes for a plurality of functions including a remote control function and an other function, the remote control function being a function of controlling an external terminal to display a remote control screen corresponding to the input interface and of performing a remote control of the display apparatus based on an instruction from the external terminal, the instruction from the external terminal being received through the communication interface in response to an operation on the remote control screen,
the controller being configured to:
in response to receiving a start request for an approval process, determine whether the remote control function is currently executed; and
in response to determining that the remote control function is not currently executed, execute the approval process, the approval process being controlling the display to display an approval screen and permitting start of the other function in response to an approval operation received on the approval screen.

2. The display apparatus according to claim 1, wherein each of the plurality of functions has a degree of importance; and
wherein the controller is configured to:
determine whether the degree of importance of the other function for which the start request for the approval process is received is higher than the degree of importance of the remote control function;
in response to determining that the remote control function is currently executed and that the degree of importance of the other function is higher than the degree of importance of the remote control function, interrupt the remote control function;
execute the approval process for which the start request is received in a state where the remote control function is interrupted; and
restart the remote control function after finishing the approval process; and
in response to determining that the remote control function is currently executed and that the degree of importance of the other function is lower than the degree of importance of the remote control function, not execute the approval process for which the start request is received.

3. The display apparatus according to claim 2, wherein the controller is configured to:
in response to determining that the remote control function is currently executed and that the degree of importance of the other function is equal to the degree of importance of the remote control function, control the display to display the approval screen and permit start of the other function in response to an instruction received from the external terminal through the communication interface based on the approval operation on the approval screen.

4. The display apparatus according to claim 2, wherein the controller is configured to:
in response to determining that the remote control function is currently executed and that the degree of importance of the other function is equal to the degree of importance of the remote control function, control the display to display an inquiry screen for inquiring whether to execute the approval process even while the remote control function is currently executed;
in response to receiving, through the inquiry screen, an instruction operation of executing the approval process, control the display to display the approval screen and permit start of the other function in response to the approval operation on the approval screen; and
in response to receiving, through the inquiry screen, an instruction operation of not executing the approval process, put on hold the approval process until the remote control function is finished.

5. The display apparatus according to claim 4, wherein the controller is configured to:
in response to receiving an end instruction of the remote control function from the external terminal after putting the approval process on hold, execute the approval process that is put on hold.

6. The display apparatus according to claim 2, wherein the other function includes a first function executable with an administrator authority and a second function executable with an authority lower than the administrator authority; and
wherein the controller is configured to determine that the degree of importance of the first function is higher than the degree of importance of the second function.

7. The display apparatus according to claim 1, wherein the controller is configured to, in response to determining that the remote control function is currently executed, control the display to display that the remote control function is currently executed.

8. The display apparatus according to claim 1, wherein the controller is configured to, in response to determining that the remote control function is currently executed, not execute the approval process.

9. The display apparatus according to claim 1, wherein the remote control function is executable with an administrator authority and is not executable with an authority lower than the administrator authority.

10. The display apparatus according to claim 1, wherein the plurality of functions further includes a first function and a second function;
wherein when the start request for the approval process is for the first function, the controller is configured to:
receiving the start request for the approval process;
determining that the remote control function is currently executed;
interrupting the remote control function;
executing the approval process for which the start request is received in a state where the remote control function is interrupted; and
restarting the remote control function after finishing the approval process; and
wherein when the start request for the approval process is for the second function, the controller is configured to:
receiving the start request for the approval process;
determining that the remote control function is currently executed; and
not executing the approval process for which the start request is received.

11. A non-transitory computer-readable storage medium storing a set of program instructions for a display apparatus comprising an input interface including a display, a communication interface, and a controller, the set of program instructions, when executed by the controller, causing the display apparatus to perform:
executing processes for a plurality of functions including a remote control function and an other function, the remote control function being a function of controlling an external terminal to display a remote control screen corresponding to the input interface and of performing a remote control of the display apparatus based on an instruction from the external terminal, the instruction from the external terminal being received through the communication interface in response to an operation on the remote control screen;
in response to receiving a start request for an approval process, determining whether the remote control function is currently executed; and
in response to determining that the remote control function is not currently executed, executing the approval process, the approval process being controlling the display to display an approval screen and permitting start of the other function in response to an approval operation received on the approval screen.

12. A method of controlling a display apparatus, comprising:
executing processes for a plurality of functions including a remote control function and an other function, the remote control function being a function of controlling an external terminal to display a remote control screen corresponding to a display of an input interface of the display apparatus and of performing a remote control of the display apparatus based on an instruction from the external terminal, the instruction from the external terminal being received through a communication interface of the display apparatus in response to an operation on the remote control screen;
in response to receiving a start request for an approval process, determining whether the remote control function is currently executed; and
in response to determining that the remote control function is not currently executed, executing the approval process, the approval process being controlling the display to display an approval screen and permitting start of the other function in response to an approval operation received on the approval screen.

* * * * *